Dec. 24, 1940.   F. H. BYERMAN   2,226,333
INTERNAL COMBUSTION ENGINE
Filed July 15, 1938   2 Sheets-Sheet 2

Inventor
F. H. Byerman
By Clarence A. O'Brien
and Hyman Berman
Attorneys

Patented Dec. 24, 1940

2,226,333

UNITED STATES PATENT OFFICE 2,226,333

INTERNAL COMBUSTION ENGINE

Forest H. Byerman, Springfield, Ohio

Application July 15, 1938, Serial No. 219,474

1 Claim. (Cl. 123—51)

This invention relates to internal combustion engines especially adapted for high speed work, such as the propulsion of racing cars, aircraft and other types of vehicles, wherein it is desired to have a maximum amount of power from a minimum consumption of fuel with endurance, compactness and low cost of construction and maintenance. The primary object of this invention is the provision of opposed pistons in each cylinder, both driven by the expanding fuel and in opposite directions and connected to crank shafts by comparatively short connecting rods and cranks of said shafts to permit high speed performance to be obtained, such as that of an engine having short strokes to its pistons, with a power takeoff driven from said crank shafts by comparatively long connecting rods and cranks providing the advantages derived from an engine employing a long stroke to its pistons, which permits greater power to be derived for propulsion of a vehicle.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a horizontal sectional view illustrating an internal combustion engine constructed in accordance with my invention.

Figure 1:
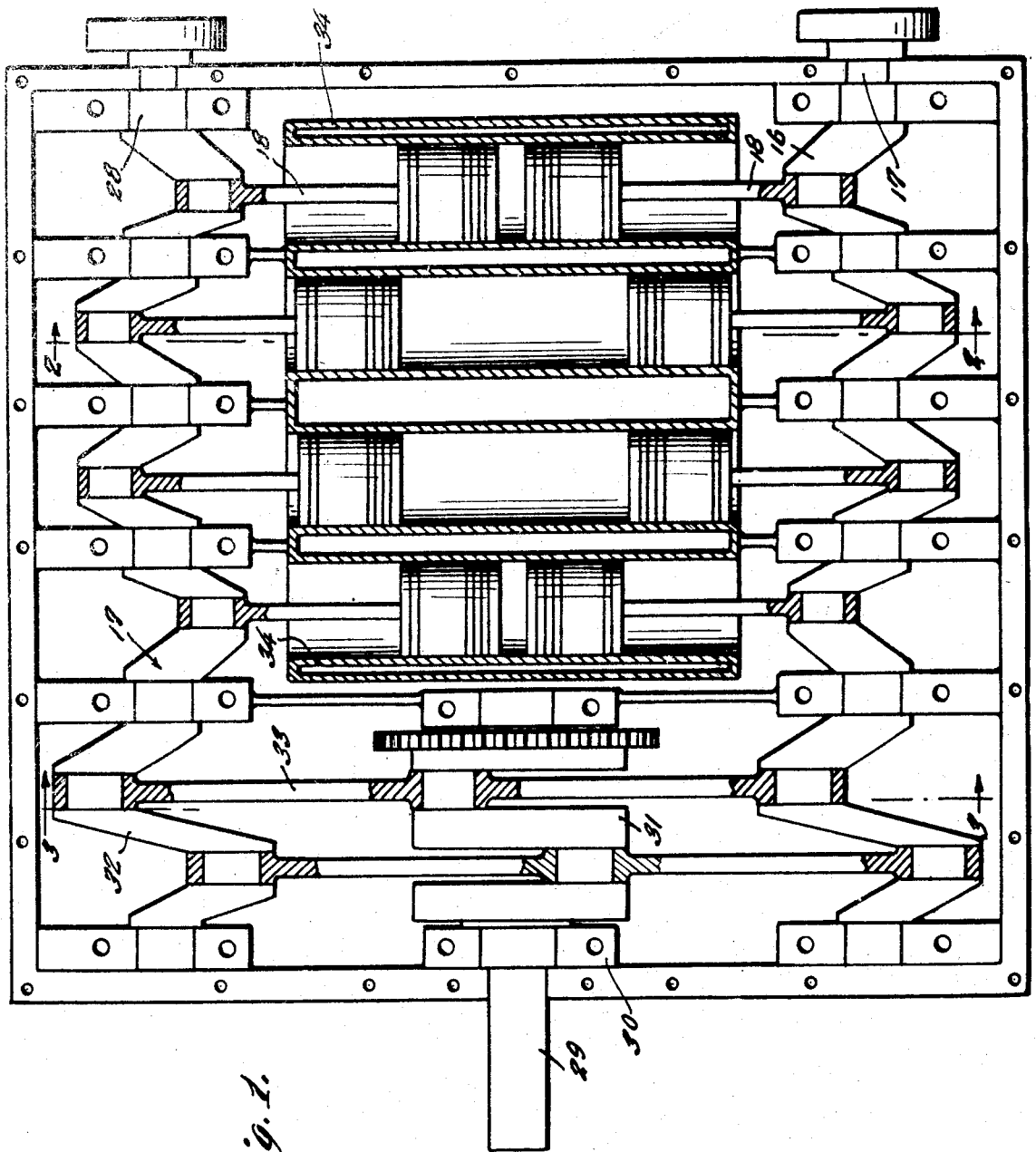
Figure 2:
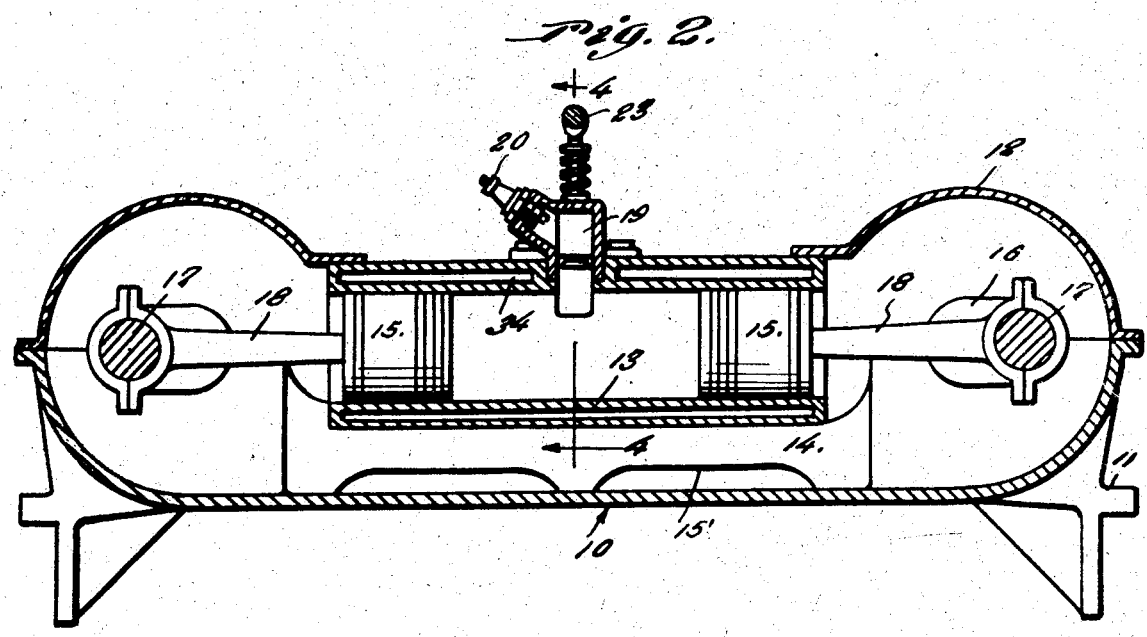
Figure 2 is a transverse sectional view taken on the line 2—2 of Figure 1.
Figure 3:
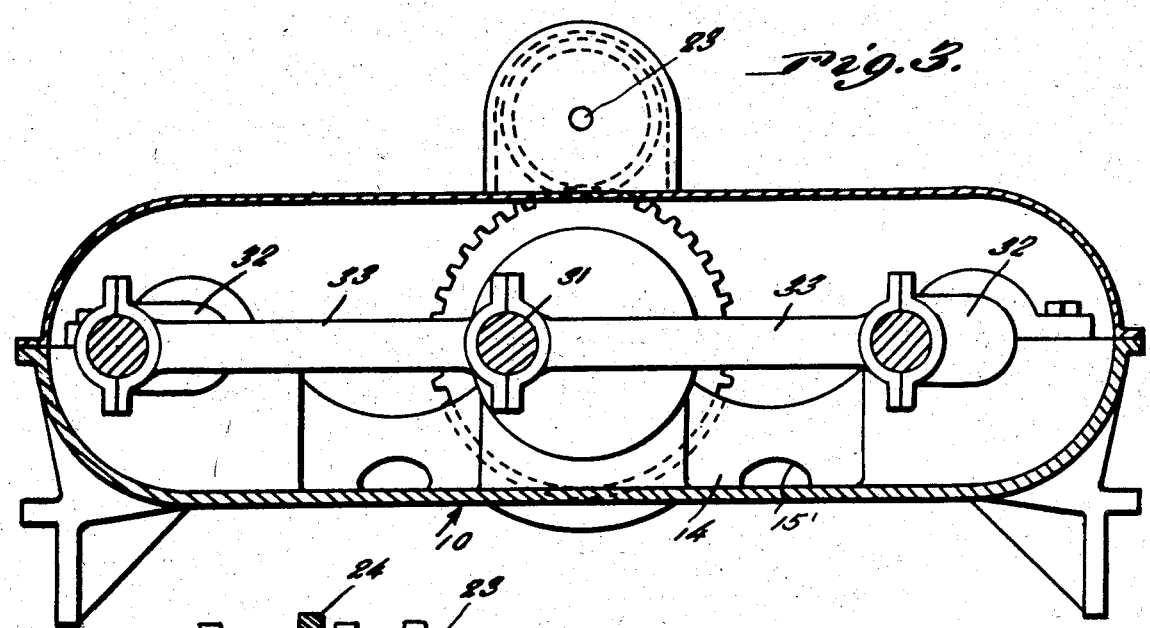
Figure 3 is a sectional view taken on the line 3—3 of Figure 1.
Figure 4:
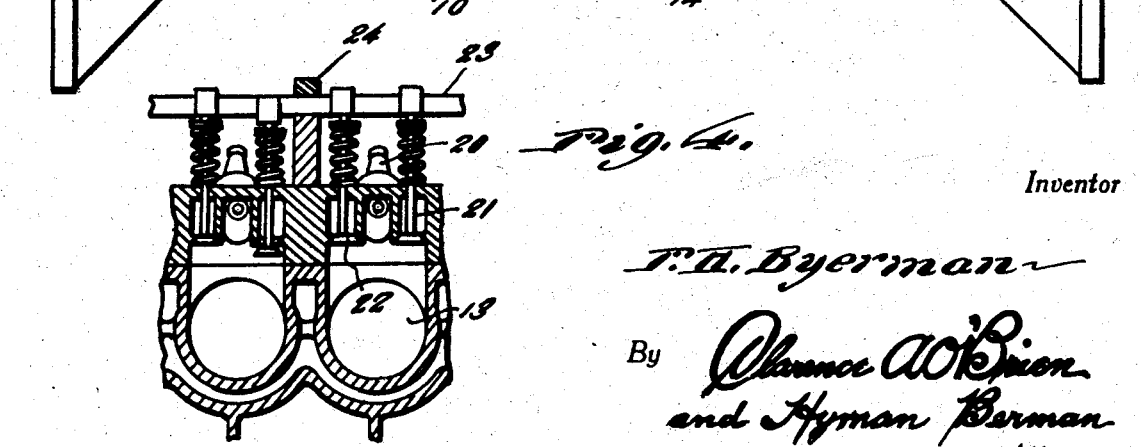
Figure 4 is a sectional view taken on the line 4—4 of Figure 2.

Referring in detail to the drawings, the numeral 10 indicates an engine base provided at its opposite ends with rests 11 to engage with an engine bed, which may be the chassis frame of a vehicle or the bed in an aircraft for supporting the engine. The engine base 10 also provides a crank case in which lubricant is placed and circulated under pressure by a suitable means (not shown) for the purpose of lubricating the moving parts of the engine. The base 10 includes removable end sections 12 for assembling of parts within the motor base. Mounted in the motor base are horizontally arranged cylinders 13 supported on the base by members 14 cutaway, as shown at 15', to permit free circulation of lubricant within the base. Each cylinder is provided with opposed pistons 15 connected to cranks 16 of crank shafts 17 by a comparatively short connecting rod 18. The cranks 16 have short throws so as to provide short strokes to the pistons. The cylinders intermediate their ends are provided with a firing chamber 19 in which are located spark plugs 20 and intake and exhaust valves 21 and 22. The firing chambers are fed with fuel in any well known manner through the intake valves and the spent gases are permitted to escape by the exhaust valves. The pistons operate on the four cycle principle. The intake and exhaust valves are operated by cams of a cam shaft 23 journaled in supports 24 carried by the cylinders and arranged above the latter. Timing gears connect the cam shaft to a power takeoff shaft 29.

The crank shafts 17 are journaled in suitable bearings 28 provided in the engine base 10. The cylinders being horizontally disposed and closely related permit the device in entirety to be constructed with compactness.

The power takeoff shaft 29 is journaled in the motor base 10 with a portion extending exteriorly thereof, as clearly shown in Figure 1, for connection with a clutch or some other similar mechanism (not shown). Bearings 30 rotatably support the power takeoff shaft in the motor base. The power takeoff shaft is located at one end of the group of horizontally arranged cylinders and substantially intermediate the ends of said cylinders and is provided with comparatively long cranks 31 connected to comparatively long cranks 32 formed on the crank shafts 17 by comparatively long connecting rods 33 whereby increased leverage is provided on the power takeoff shaft from the crank shafts 17 giving the engine the advantage of having a long stroke operation still permitting the pistons of the engine to operate with short strokes so that the engine pistons may reciprocate at rapid speed.

The cylinders are provided with the usual water jacket spaces indicated by the character 34. The circulation of cooling fluid may be accomplished through the water jackets in any well known manner.

An engine of the character described and shown in the drawings will be durable, compact and efficient and may be manufactured and maintained in operation at a low cost and is capable of developing maximum power from a minimum consumption of fuel due to the arrangement of the opposed pistons in each cylinder and connected to the crank shafts for relatively short strokes permitting high speed operation thereof and further the crank shafts being connected to the power takeoff shaft with comparatively long cranks and connecting rods permits the maximum power to be developed from a high speed operation of the pistons, consequently providing an engine very desirable for high speed work or performance such as required in racing cars, racing water craft, aircraft and similar devices.

While four cylinders are shown in the drawings, it is to be understood that the number of cylinders can be increased and decreased and through the arrangement of said cylinders with opposed pistons operating therein each cylinder will be capable of producing with its pistons approximately twice as much power as a single cylinder with a single piston.

It is believed that the foregoing description, when taken in connection with the drawings will fully set forth the construction and advantages of this invention to those skilled in the art to which such devices relate, so that further detailed description will not be required.

What I claim is:

In an internal combustion engine, a base of substantially rectangular shape in plan and forming a crankcase, a pair of oppositely arranged crank shafts journaled in the base, one adjacent one side thereof and the other adjacent the opposite side thereof, a short crank shaft journaled in an end portion of the base at the center thereof, long connecting rods connecting the cranks of the short crank shaft with certain ones of the cranks of the long crank shafts, said certain cranks being larger than the other cranks of said long shafts, a horizontal set of cylinders supported in the base in the space formed by the three crank shafts with the axis of the short crank shaft in alignment with the transverse centers of the cylinders, a pair of pistons in each cylinder, rods connecting the pistons with the small cranks of the long crank shafts, means for introducing explosive mixtures to the centers of the cylinders between the pistons and ignition means for firing the mixture, inlet and exhaust valves and means for operating the same from the short crank shaft, the rods which connect the pistons with the long crank shafts being shorter than the rods which connect the cranks of the short crank shaft with the cranks of the long crank shafts.

FOREST H. BYERMAN.